United States Patent [19]

Howell et al.

[11] 4,377,520
[45] Mar. 22, 1983

[54] CITRUS OIL CONTAINING A HIGH CONCENTRATION OF CAROTENOID PIGMENTS AND METHOD FOR PRODUCING SAME

[75] Inventors: Tony M. Howell, Apopka; Carl F. Huffman, Maitland, both of Fla.

[73] Assignee: The Coca-Cola Company, Atlanta, Ga.

[21] Appl. No.: 338,740

[22] Filed: Jan. 11, 1982

Related U.S. Application Data

[63] Continuation of Ser. No. 152,545, May 23, 1980, abandoned.

[51] Int. Cl.$^3$ .......................... C11B 9/00; A23L 1/27; A23L 1/212
[52] U.S. Cl. ................................. 260/236.6; 426/616; 426/540; 426/534
[58] Field of Search ..................... 260/236.6; 426/616, 426/540, 534

[56] References Cited

U.S. PATENT DOCUMENTS 2,708,627 5/1955 Toulmin, Jr. ................ 260/236.6 X
3,506,047 4/1970 Greenlaw ......................... 260/236.6

FOREIGN PATENT DOCUMENTS 584273 2/1925 France .

Primary Examiner—Donald B. Moyer
Attorney, Agent, or Firm—John R. Martin; W. Dexter Brooks

[57] ABSTRACT

An essential peel oil containing high concentrations of carotenoid pigments and organoleptic constituents may be produced from citrus fruits by a process of abrading the flavedo in small pieces with maximum rupture of peel oil sacs and chromoplasts, mixing the abraded flavedo with a suitable solid dehydrating agent, and pressing the mixture so-produced to express the highly colored oil.

27 Claims, No Drawings

CITRUS OIL CONTAINING A HIGH CONCENTRATION OF CAROTENOID PIGMENTS AND METHOD FOR PRODUCING SAME

This is a continuation of application Ser. No. 152,545 filed May 23, 1980, now abandoned.

BACKGROUND OF THE INVENTION

Citrus fruits, e.g. oranges, lemons, limes, etc., consist of an endocarp containing the juice sacs and seeds, a mesocarp of white, pulpy material commonly called the albedo and an exocarp, commonly called the flavedo, which contains the essential peel oil sacs and the plastids which contain color bodies. In immature fruit, the plastids are referred to as chloroplasts because they contain relatively large amounts of chlorophyll and relatively small amounts of carotenoid pigments, and, therefore, give the fruit a green color. As the fruit matures, the amount of chlorophyll decreases and the amount of carotenoids increases to ultimately give the fruit its characteristic ripe color. The plastids in such mature fruits are referred to as chromoplasts.

The carotenoid pigments present in the flavedo chromoplasts potentially have many commercial uses, especially if they could be isolated in a concentrated form in the essential peel oil. For example, juices extracted from early season fruit often have poor coloring and, after concentration, reduced flavor. These deficiencies could be remedied by adding a highly colored essential peel oil to improve color and enhance the flavor of these juices. Further, such highly colored peel oils have many potential commercial uses as colorants and flavoring materials in other food products.

The prior art teaches a variety of ways for extracting peel oil from oranges, both by mechanical and by chemical means. Several mechanical devices for extracting essential peel oil from fruit have been developed ["Florida Citrus Oils", Kesterson, et al., Technical Bulletin 749, December 1971, pp 15-20]. In one device, blades cut into the flavedo while simultaneously squeezing the fruit in order to press out the juice and rupture the peel oil sacs. The released oil, along with pieces of peel, is then washed away with a water spray to be recovered later by centrifugation. In another device, stainless steel cylinders which have sharp pointed projections are rotated on a shaft, and, as the fruit passes over them, the oil is released by the piercing action. A mist of water washes the oil from the fruit, and the resulting oil and water mixture is collected in a pan below the cylinders to be subsequently clarified by centrifugation. In yet another device, peel cups or quarters from juice extractors are fed into an extractor where a knife blade splits the peel into flat pieces of albedo and flavedo. The flavedo slice is given a knurled roll pressing in the presence of water to release and transfer its oil to the water. Separation of the oil-water mixture from the flavedo is then made with a paddle finisher.

The extractors described above provide fast and efficient methods of obtaining peel oil from oranges. However, because of their inherent requirements for water sprays to facilitate oil removal, water soluble flavoring components in the oil, such as decanal and linalool, are lost during processing. In addition the oils recovered by these methods are generally low in carotenoids due to insufficient contact time of the released oil with the chromoplasts in the spent flavedo. The levels of carotenoid pigments present in oils extracted as described above are so low that addition of even the maximum allowable amount of such oils to food products does not significantly affect their color. Thus such mechanical extraction, while efficient for peel oil, is inefficient for peel carotenoids.

The prior art also teaches solvent extraction of the carotenoids remaining in the spent flavedo. In the "Proceedings of the Florida State Horticultural Society," volume 81, pages 264–268 (1968), Ting and Hendrickson disclose a method whereby the peel carotenoids are extracted from ground flavedo with acetone, and, in *Food Technology*, volume 23, pages 87–90 (1969), Ting and Hendrickson disclose an improvement on the above-described process which comprises diluting the acetone extracts with water, extracting the carotenoids from the aqueous acetone solution with hexane, and purifying the carotenoids by column chromatography.

Kew and Berry [Journal of Food Science, 35, pp. 436–439 (1970)] disclose a method in which spent flavedo is finely ground in the presence of n-hexane. The carotenoid-containing hexane solution is isolated from the peel particles and partially concentrated. After further treatment of the carotenoid solution with methanolic potassium hydroxide and subsequent steam distillation, the hexane extract is concentrated by evaporation.

While the aforementioned methods provide efficient means of extracting carotenoid pigments from orange flavedo, the use of solvents precludes the use of such pigments in foods under the food laws of many countries. In addition, the final products obtained are devoid of most or all of the volatile flavoring components by virtue of the concentration steps.

From the foregoing discussion of prior art practices, it does not appear that an efficient process has been developed for the production of an essential peel oil which contains both the volatile flavoring components and a high concentration of the carotenoid pigments found in the flavedo chromoplasts.

SUMMARY

It has now been discovered that an essential peel oil which contains a high concentration of both carotenoid pigments and volatile flavoring components may be produced by a process of removing the flavedo of the fruit as finely divided particles, combining the particles with a suitable solid dehydrating agent to induce permeation of water from the chromoplasts, and upon dehydration, to form a substantially uniform pressable mixture, allowing the mixture to stand for a suitable period of time, and pressing the mixture to express the highly colored and flavored peel oil.

DESCRIPTION OF THE PREFERRED EMBODIMENT OF THE INVENTION

A complete understanding of the invention, together with the best mode of operation thereof, will be gained by those skilled in the art from the description and examples set forth below.

A highly colored orange essential peel oil was produced by the process described in Example I.

EXAMPLE I

A number of washed oranges were selected on the basis of skin color and the lack of visible chlorophyl pigments. Each orange was abraded to a depth of approximately 0.031 inches with a 4 inch diameter wire brush wheel rotating at 1750 rpm and having 0.004 inch bristles by turning the orange so that the entire surface was abraded. The flavedo pieces, peel oil and peel juice were swept away from the orange. This depth of abrasion left the albedo intact and produced a mash containing tiny particles of flavedo, along with peel oil and peel juice.

The mash was thoroughly mixed in a mixing vessel, and 100 to 325 mesh anhydrous sodium sulfate was slowly added to the mixing mash to attain a final salt-:mash ration (wt:wt) of 1:4. After complete addition of the sodium sulfate, the mixture was blended for an additional ten minutes and then placed in storage at 40° F. for sixteen hours. During this period the sodium sulfate became hydrated with the peel water, the peel oil absorbed the carotenoids from the flavedo and a pressable mixture was formed.

At the end of the 16 hour storage period, the mixture was placed in a piston and cylinder assembly and pressure applied slowly in a hydraulic press up to a maximum specific pressure of 520 psig. As pressure was slowly increased, the oil and water flowed out of the mash. Pressure was maintained until oil and water no longer flowed from the press cylinder. Pressure was then released, the press cake taken from the cylinder, remixed and pressed a second and third time.

The highly colored oil, containing small amounts of water, obtained from the three pressings was combined and centrifuged to facilitate separation and to break the emulsion interface. After separation of the oil phase from the water phase, the highly colored oil was cooled to $-15°$ C. to precipitate out unwanted waxes. The final oil was high in carotenoid pigments and had chemical and organoleptic characteristics similar to those found in commercial cold pressed orange oil.

EXAMPLE II

A procedure essentially identical to that described in Example I was repeated with the single exception that magnesium sulfate dihydrate at a salt:mash ratio of 1:2.5 was substituted for anhydrous sodium sulfate at a 1:4 ratio.

This procedure resulted in the production of a highly colored orange oil essentially identical to that produced in Example I.

Several additional experiments were performed in order to quantify broad, preferred and optimum ranges for the various process variables.

Various methods of flavedo removal were attempted in addition to removal with a wire brush. Standard grinding wheels, and especially carborandum rolls were found to function efficiently and to produce a mash which yielded an acceptable highly colored oil upon pressing. In the procedure using carborundum rolls the maximum oil yield was obtained when a 2" diameter roll having a grit size of from about 60 to about 100 grit was rotated at 1200 rpm to produce the mash. Ground flavedo which had been removed from the fruit with a sharp knife yielded lesser quantities of highly colored oil than flavedo particles obtained by abrasion. Other methods of obtaining finely divided peel particles may be apparent to those skilled in the art.

For wire brush flavedo abrasion, a broad range of wheel speed of about 1200 rpm to 2300 rpms, a preferred range of about 1500 to 2000 rpm and an optimum speed of about 1750 rpm were determined for the 4 inch wire brush wheel. At speeds lower than 1200 rpm, the peel particles tended to adhere to the brush and smear back on the surface of the fruit being abraded. At speeds in excess of 2300 rpm the peel particles tended to be flung off the bristles of the brush over a broad area thus complicating collection.

Thus it appears that the speed at which the outer ends of the wire-brush bristles impact the flavedo is of practical importance to the abrading step in the process. This speed, which is hereinafter referred to as circumferential velocity, may be calculated in the units "inches per second" (ips) according to the formula:

$C.V. = (\pi \times d \times rpm)/60$ where d is the diameter of the wire brush wheel in inches and rpm is the number of revolutions per minute of the wheel. Converting the rpm ranges given above for a 4 inch wheel according to this formula, the abrading step of the present process may be practiced over a broad range of circumferential velocities of from about 250 ips to about 480 ips, a preferred range of from about 300 ips to about 420 ips and an optimum value about 360 ips.

Wire bristles having various cross-sectional diameters were tested in several experiments and a broad range of utility was found to be limited at the lower end by lack of sufficient bristle rigidity to abrade the peel and at the upper end by a tendency to gouge the peel. The optimum bristle diameter was determined to be about 0.004 inch, the preferred range to be from about 0.002 inch to about 0.006 inch and the broad range to be from about 0.002 inch to about 0.01 inch.

The depth of flavedo abrasion should be adjusted to the point at which the albedo begins. Obviously the thickness of the flavedo will vary among different types of citrus fruit, among different individual fruit of the same type and even among different portions of the surface of a single fruit. Those skilled in the art will recognize that abrasion of the albedo should be minimized to avoid diluting the flavedo mash with non-color bearing albedo. In general, the flavedo abrasion step in the process of this invention should maximize the amount of flavedo obtained from each fruit, minimize the amount of albedo abrasion and maximize the rupture of peel oil sacs and chromoplasts in the flavedo mash produced such that the peel oil will dissolve the maximum amount of carotenoid pigment per unit weight of oil when the mash is contacted with the solid dehydrating agent.

The choice of solid dehydrating agent was investigated in a series of experiments. In general it was determined that virtually any solid that will readily take up water and incorporate that water as bound water of hydration, while still remaining pressable, will function advantageously in the present invention. Thus anhydrous sodium sulfate and magnesium sulfate dihydrate each function advantageously to absorb water present in the mash at optimum agent:mash ratios of 1:4 and 1:2.5 respectively. However, sodium chloride, calcium sulfate, calcium chloride, diatomaceous earth and silica gel were not found acceptable. One or more of several factors may render a particular agent unsuitable. Those skilled in the art will recognize that an agent which is otherwise capable of forming a hydrate may be thermodynamically unable to do so under the conditions present in the above-described process because the unhydrated agent may have assumed a particularly stable crystal lattice structure. Still other hydratable agents such as calcium sulfate, will be unsuitable because hydration causes them to harden into unpressible masses. Finally, still other agents which attract moisture, such as sodium chloride, will be unsuitable because the water associated with the salt is held at the crystal surface rather than as a discreet number of waters of hydration within the crystal lattice structure. A dehydrating agent will, therefore, be suitable for use in the present process only if it actually incorporates water into its crystal lattice structure and, thereafter, remains pressable.

In addition to the above-described limitations on the choice of dehydrating agent, various other practical considerations such as food use approval by the competent national food regulatory authority, cost, and availability will further limit the broad range of useful dehydrating salts to form a preferred range. While some degree of routine trial and error experimentation will be required in order to determine whether a certain solid, other than those described above, will be useful as a dehydrating agent in the process of this invention, those skilled in the art will be able to both choose initial candidates for hydration trials and select useful solids on the basis of such trials from the discussion of the various considerations set forth above.

The particle size of the dehydrating agent is also of some degree of importance to the efficiency of the hydration step of the process. Thus, inordinately large particles are, generally, of less utility since water present in the mash will not be able to penetrate the large particles and therefore efficient use of the full hydration capacity of the salt will not be utilized. This, in turn, will affect the amount of salt per unit weight of mash, i.e. the salt:mash ratio, necessary to adequately dehydrate the mash. On the basis of experiments performed, it was determined that 100 to 325 mesh anhydrous sodium sulfate and 80 to 100 mesh magnesium sulfate dihydrate allowed the optimum salt:mash ratio for these two species, i.e. 1:4 and 1:2.5 respectively. As with the choice of dehydrating agent, the determination of the optimum agent particle size and the optimum agent-:mash ratio for individual dehydrating agents may be determined by routine experimentation.

The degree of mixing, the length of storage time and the storage temperature of the agent/mash mixture are all factors which may be chosen to optimize the degree of dehydration accomplished. By mixing, the dehydrating agent is distributed uniformly throughout the mash thereby minimizing the possibility that separate "pockets" of water and of unhydrated agent will form and thereby reduce the efficiency of dehydration. The length of mixture storage and the temperature of storage are chosen to optimize the dissolution of the carotenoids in the released peel oil as well as to optimize the degree of hydration of the dehydration agent and consequent dehydration of the mash. As each of these factors is interrelated, it is impossible to set independent ranges for each. This is especially true because the quality of the oil ultimately produced may suffer if the degree of mixing, the storage time, or the storage temperature is too high. As set forth above, the optimum values for these three interrelated factors are a 10–20 minute mixing period, a sixteen hour storage period and a 40° F. storage temperature. None of these three process steps is critical to the utility of the process, but each step forms a part of the preferred embodiment of the invention because of the increased process efficiency attained by their use.

Removal of the highly colored oil from the agent/mash mixture is the final step in the process, and several experiments have established that the most efficient oil removal is accomplished by pressing. While filtration or simple decantation may effect some oil separation, the relative amount of oil obtained per unit weight of mash is sufficiently small that the separation realized using these latter methods reduces process efficiency drastically. Thus, although the use of pressing to express the highly colored oil from the mixture is not, strictly speaking, critical, it is contemplated that it forms a part of the preferred embodiment of the process.

In the examples disclosed above, a specific pressure of 520 psig was utilized and the mash was pressed with the presscake being remixed and repressed twice. Such a procedure was found to optimize final oil and carotenoid yield under the experimental procedures used. There does not appear to be a theoretical lower or upper limit on the pressure applied, but rather the pressures used will be determined by more practical considerations such as press availability and oil yield optimization.

Further processing steps after pressing such as centrifugation, decantation and wax removal are optional depending on the relative amounts of water and waxes present in the oil and the oil characteristics necessary for a particular end use. Thus if the end use contemplated for the highly colored oil is a water based beverage formulation, water removal by centrifugation and decantation may not be required. If, on the other hand, the oil is to be used in an organic paste, wax removal by cooling may not be required. In any event, such processing steps are well known to those skilled in the oil processing art.

Through the use of the process described herein, a highly colored oil may be isolated from oranges, as well as other citrus fruits. This oil, by virtue of the process steps which maximize the rupture of both oil sacs and chromoplast sacs during flavedo abrasion, and which utilize a solid dehydrating agent for excess water removal produces an essential peel oil which contains more carotenoid colorants and more organoleptic constituents than oils produced by prior art mechanical or chemical processes.

From the foregoing description it will be apparent that changes in the process steps or order of steps as described herein may occur to persons skilled in the art without departing from the scope and spirit of the invention. Accordingly, the foregoing description is considered to be only exemplary of the invention as defined in the appended claims.

What is claimed is:

1. A process for producing a citrus oil which contains a high concentration of carotenoid pigments, comprising:
   (a) providing a citrus fruit having a flavedo which contains peel oil sacs and carotenoid-containing chromoplasts;
   (b) abrading the flavedo away from the remainder of the citrus fruit, thereby rupturing a substantial number of carotenoid-containing chromoplasts and peel oil sacs and forming a mash containing flavedo particles, peel oil, and water, wherein said abrading comprises contacting the flavedo with either a rotating grinding wheel, a rotating carborundum roll, or a rotating wire brush wheel;
   (c) combining said mash with a solid dehydrating agent to form a pressable mixture, wherein said dehydrating agent is an inorganic salt, said salt being capable of incorporating water as bound water of hydration to form a non-hardening hydrated salt, and further wherein said salt is added in an amount sufficient to dehydrate said mash to a substantial extent;

(d) allowing said mixture of mash and inorganic salt to stand until the water present in said mash is absorbed by the salt and is incorporated in said mixture as a hydrated species and further until a substantial amount of carotenoid pigments in said chromoplasts are dissolved in said peel oil; and (e) pressing said substantially dehydrated mixture to express said citrus oil, which contains a high concentration of carotenoid pigments, and leave a mash press cake.

2. The process as set forth in claim 1 wherein said abrading comprises contacting said flavedo with a rotating grinding wheel or a rotating carborundum roll.

3. The process as set forth in claim 1 wherein said abrading comprises contacting said flavedo with a rotating wire brush wheel.

4. The process as set forth in claim 3 wherein the bristles of said wire brush wheel have a cross-sectional diameter of from about 0.002 to about 0.01 inches.

5. The process as set forth in claim 4 wherein said wire brush wheel is rotating at a circumferential velocity of from about 250 ips to about 480 ips.

6. The process as set forth in claim 1 wherein said salt is selected from the group consisting of anhydrous sodium sulfate and magnesium sulfate dihydrate.

7. A citrus oil produced by the process as set forth in claim 1.

8. A process for producing a citrus oil which contains a high concentration of carotenoid pigments, comprising:

(a) providing a citrus fruit having a flavedo which contains peel oil sacs and carotenoid-containing chromoplasts;

(b) abrading the flavedo away from the remainder of the citrus fruit with a wire brush wheel having individual bristles of a cross-sectional diameter of from about 0.002 to about 0.01 inch, said wheel rotating at a circumferential velocity of from about 250 ips to about 480 ips, thereby rupturing a substantial number of carotenoid-containing chromoplasts and peel oil sacs and forming a mash containing flavedo particles, peel oil, and water;

(c) combining said mash with a solid dehydrating agent to form a pressable mixture, wherein said dehydrating agent is an inorganic salt, said salt being capable of incorporating water as bound water of hydration to form a non-hardening hydrated salt, and further wherein said salt is added in an amount sufficient to dehydrate said mash to a substantial extent;

(d) mixing said mixture to provide substantially homogenous distribution of said solid dehydrating agent throughout said mixture;

(e) allowing said mixture of mash and inorganic salt to stand until the water present in said mash is absorbed by the salt and is incorporated in said mixture as a hydrated species and further until a substantial amount of carotenoid pigments in said chromoplasts are dissolved in said peel oil; and (f) pressing said substantially dehydrated mixture to express said citrus oil, which contains a high concentration of carotenoid pigments and leave a mash press cake.

9. The process as set forth in claim 8 wherein said salt is selected from the group consisting of anhydrous sodium sulfate and magnesium sulfate dihydrate.

10. The process as set forth in claim 9 wherein said salt is magnesium sulfate dihydrate and the weight ratio of said dihydrate to said mash is about 1:2.5.

11. The process as set forth in claim 10 wherein the particle size of said magnesium sulfate dihydrate is about 80–100 mesh.

12. The process as set forth in claim 9 wherein said salt is anhydrous sodium sulfate and the weight ratio of said anhydrous sodium sulfate to said mash is about 1:4.

13. The process as set forth in claim 12 wherein the particle size of said anhydrous sodium sulfate is about 100–325 mesh.

14. The process as set forth in claim 8 additionally comprising remixing said mash press cake and repressing said mash press cake.

15. The process as set forth in claim 14 additionally comprising purifying said expressed highly colored citrus oil.

16. A citrus oil produced by the process as set forth in claim 8.

17. A process for producing a citrus oil which contains a high concentration of carotenoid pigments, comprising:

(a) providing a citrus fruit having a flavedo which contains peel oil sacs and carotenoid-containing chromoplasts;

(b) rotating a wire brush wheel at a circumferential velocity of from about 300 ips to about 420 ips, said wire brush wheel having bristles of about 0.002 to about 0.006 inch in cross-sectional diameter;

(c) abrading said flavedo away from the remainder of said citrus fruit with said rotating wire brush wheel, thereby rupturing a substantial number of carotenoid-containing chromoplasts and peel oil sacs and forming a mash containing flavedo particles, peel oil, and water;

(d) mixing said mash with an inorganic salt, said salt being capable of incorporating water as bound water of hydration to form a non-hardening hydrated salt, said salt being added in an amount sufficient to dehydrate said mash to a substantial extent;

(e) storing said mash/salt mixture until the water present in said mash is absorbed by the salt and is incorporated in said mixture as a hydrated species and further until a substantial amount of carotenoid pigments in said chromoplasts are dissolved in said peel oil;

(f) warming said mixture during said storing; and (g) pressing said substantially dehydrated mixture to express said citrus oil, which contains a high concentration of carotenoid pigments, and leave a mash press cake.

18. The process as set forth in claim 17 wherein said inorganic salt is anhydrous sodium sulfate and the weight ratio of salt to mash is about 1:4.

19. The process as set forth in claim 18 wherein said rotating is at a circumferential velocity of about 360 ips.

20. The process as set forth in claim 18 wherein said anhydrous sodium sulfate is about 100–325 mesh.

21. The process is set forth in claim 20 wherein said storing is for a period of about 16 hours and wherein said warming is to a temperature not greater than about 50° C.

22. The process as set forth in claim 21 additionally comprising remixing and repressing said mash press cake to yield additional citrus oil.

23. The process as set forth in claim 22 wherein said citrus fruit is an orange and said citrus oil is highly colored orange oil.

24. The process as set forth in claim 17 wherein said inorganic salt is magnesium sulfate dihydrate and the weight ratio of salt to mash is 1:2.5.

25. A citrus oil produced by the process as set forth in claim 17.

26. A process for producing an orange oil which contains a high concentration of carotenoid pigments, comprising;
 (a) providing an orange having a flavedo containing peel oil sacs and carotenoid-containing chromoplasts;
 (b) further providing a wire brush wheel having wire bristles of 0.004 inch cross-sectional diameter;
 (c) rotating said wire brush wheel at a circumferential velocity of about 360 ips;
 (d) abrading the flavedo away from the remainder of citrus fruit with said rotating wire brush wheel, thereby rupturing a substantial number of carotenoid-containing chromoplasts and peel oil sacs and forming a mash containing flavedo particles, peel oil, and water;
 (e) combining said mash with 100 to 325 mesh anhydrous sodium sulfate in a salt to mash weight ratio of about 1.4 to form a substantially homogeneous mixture;
 (f) storing said mixture for about sixteen hours at a temperature of about 40° C.;
 (g) placing said mixture in a piston and cylinder assembly, said assembly so constructed and arranged as to allow said piston to impact said mixture and express said peel oil therefrom through openings in said cylinder;
 (h) inserting said piston and cylinder assembly containing said mixture in a press;
 (i) activating said press to apply pressure through said piston and cylinder assembly to said mixture such that an amount of said citrus oil containing a high concentration of carotenoid pigments is expressed therefrom to leave a mash press cake;
 (j) collecting said amount of orange oil;
 (k) releasing said pressure and removing said mash press cake from said assembly;
 (l) remixing said press cake;
 (m) repressing said remixed mash press cake to obtain an additional amount of orange oil;
 (n) combining said amount of orange oil; and
 (o) purifying said combined amounts of said oil.

27. An orange oil produced by the process as set forth in claim 26.

* * * * *